3,308,163
PROCESS FOR PREPARING PEROXY COMPOUNDS
Wilbur H. McKellin, Buffalo, N.Y., assignor to Wallace and Tiernan, Inc., Buffalo, N.Y., a corporation of Delaware
Filed Mar. 9, 1964, Ser. No. 350,185
7 Claims. (Cl. 260—610)

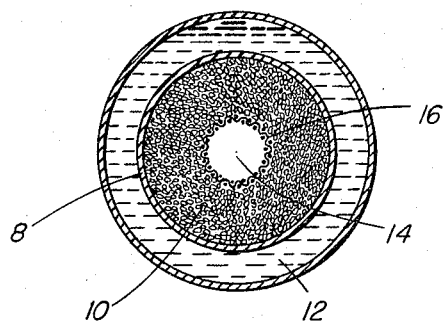
FIG. I
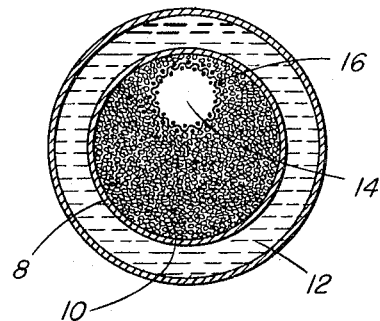
FIG. II
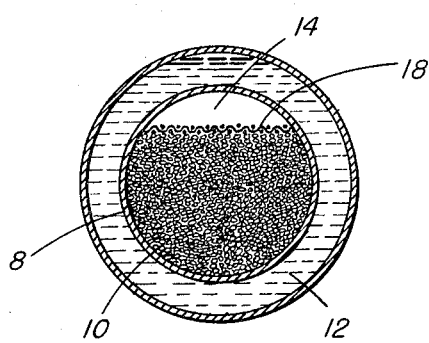
FIG. III
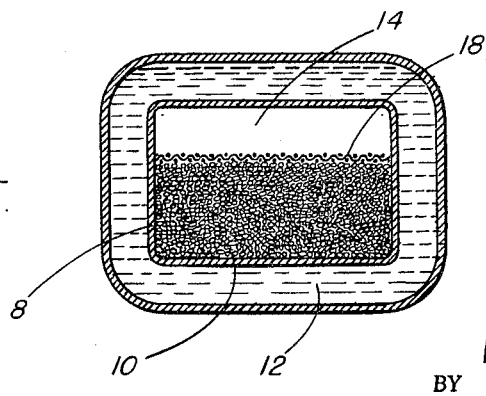
FIG. IV
INVENTOR.
Wilbur H. McKellin
BY
Attorney

United States Patent Office
3,308,163
Patented Mar. 7, 1967

This invention relates to organic peroxy compounds and to processes of preparing these compounds.

Organic hydroperoxides and/or organic peroxides are prepared by reactions involving either hydrogen peroxide or an organic hydroperoxide; these reactions use acid catalysts. Yields are frequently low in those reactions which produce water as a reaction product. It is known to improve yield by carrying out these reactions in the presence of water sequestering agents such as magnesium sulfate or sulfuric acid—which acts in two capacities; or in the presence of solvents, such as hydrocarbons.

The use of sequestering agents or solvents introduces other problems into the process because the agent or solvent must be separated from the final product and also the reaction conditions must be modified because of the presence of the agent or solvent.

An object of this invention is an acid catalyzed process for preparing organic peroxy compounds by the reaction of organic compounds and a hydroperoxide where water is a reaction product.

Another object of this invention is such a process providing increased yields of organic peroxy compounds.

Still another object of this invention is such a process where better control of product distribution is afforded.

A particular object of this invention is such a process where water sequestering agents and/or solvents are dispensed with.

A special object is such a continuous process and reaction zones adapted for continuous operation.

Another special object is a process wherein hydroperoxide reactant is used to eliminate water reaction product from the reaction zone.

Yet another object is the preparation of a new class of peroxy compounds having a sulfur atom in the molecule.

A further object is a process of making hydroperoxides from olefins.

Other objects will become apparent in the course of the detailed description of the invention.

The figures show cross-sectional view of simple reaction zones suitable for continuous processes.

FIGURE I illustrates apparatus suitable for a vertical reaction zone.

FIGURES II, III and IV illustrate apparatus suitable for an inclined or horizontal reaction zone.

Briefly, the process of the invention reacts, in the presence of an acid catalyst therefor, a hydroperoxide and an organic compound to produce an organic peroxy compound and water while substantially continuously distillatively removing water from the reaction zone; the water being distilled overhead in the form of an azeotrope where one or more of the organic compounds present, either reactant(s) and/or reaction product(s) is the azeotropic entrainer.

Hereinafter, the term "organic peroxy compound" includes both organic hydroperoxides (ROOH) and organic peroxides (ROOR'). The term "hydroperoxide" includes both organic hydroperoxides (ROOH) and hydrogen peroxide (HOOH; $H_2O_2$).

It has been discovered that with organic peroxy compounds which form azeotropes with water, by operation under suitable conditions, water can be taken out of the reaction zone in the form of a vaporous azeotropic mixture. Certain reactive organic compounds also form azeotropes with water which azeotropic mixtures can be distilled out of the reaction system. Thus the organic compound azeotrope entrainer may be: organic hydroperoxide and/or reactive organic compound charged to the reaction zone; and/or organic peroxy compound product of the reaction. In some instances azeotropes may be formed by the organic compound and also by one of the organic peroxy compounds to give two binary azeotropes or one or more ternary azeotropes may be formed. In general, the azeotrope with the lowest boiling point will be utilized as the primary water removal system.

The reactive organic compound may be any one which reacts with a hydroperoxide to obtain an organic peroxy compound and water reaction product. It is to be understood that the reactive organic compound may include one or more non-reactive functional groups e.g. sulfone, nitro, sulfoxide, sulfide, etc. The organic compound may itself include a peroxy (—OO—) group, such as a hydroxy peroxy compound which reacts to form a diperoxy compound.

Compounds containing a hydroxy group and/or a carbonyl group are especially suitable for use in the process. The reactive organic compounds including a carbonyl group (aldehydo or keto) and/or a hydroxy group are the compounds most commonly reacted with hydroperoxide to yield water as a by-product. The organic carbonyls may be any aldehydo or keto compound. The organic hydroxy compounds may be any monohydric alcohol or polyhydric alcohol. Aldehydo alcohols and keto alcohols include both classes of the common reactive groups which produce water by-product. The process of the invention is of especial interest to the hydroxy or carbonyl substituted carboxylic acids, such as levulinic acid, or the esters thereof, such as butyl levulinate.

The acid catalyst may be any one of these known to be effective for this reaction, such as, sulfuric acid; phosphoric acid; salts of sulfuric acid and phosphoric acid; hydrochloric acid solutions; and sulfonic acids, e.g., toluene sulfonic and alkane sulfonic. The acidic solid ion exchange resins are a preferred class of acid catalysts. A listing of common commercially available acidic ion exchange resins is set out at pages 574–577 of F. Helfferich "Ion Exchange," 1962 (McGraw-Hill Book Co.).

While the process is applicable to any reaction system wherein the removal of water may be assisted or accelerated by means of azeotrope formation, the invention is most beneficial when applied to systems whose reaction temperatures are below the boiling point of water and where the distillative removal of the vaporous azeotropic mixture must be carried out without going to extremes of very low vacuum operation. Thus in the reaction system, the azeotropic entrainer is preferably a lower boiling aldehyde, ketone, alcohol, organic hydroperoxide or organic peroxide. Illustrative are aliphatic aldehydes and ketones having not more than 10 carbon atoms; aliphatic monohydric alcohols (preferably the tertiary alcohols) having not more than 10 carbon atoms; liquid alkyl hydroperoxides having not more than 8 carbon atoms; and di-alkyl peroxides having not more than 8 carbon atoms in each alkyl group.

Illustrative reactions wherein the water is removed by azeotropic distillation are:

(I) Tert-butyl alcohol and t-butyl hydroperoxide are reacted in the presence of 77% sulfuric acid to form di-t-butyl peroxide and water. Di-t-butyl peroxide boils below t-butyl hydroperoxide. Temperature and pressure on the system are adjusted to distill an azeotrope of the di-t-butyl peroxide and water to increase the conversion of the hydroperoxide. Here the t-butyl alcohol is sulfated in situ to the very high boiling hydrogen sulfate and therefore cannot function as an azeotroping agent.

(II) Tert-butyl alcohol and t-butyl hydroperoxide are reacted in the presence of solid sulfonic acid ion exchange resin to form di-t-butyl peroxide and water. Here the azetotropic ternary mixture is water, t-butyl alcohol and di-t-butyl peroxide. A sufficient excess of alcohol is charged to permit essentially complete conversion of the hydroperoxide to the peroxide, while affording the amount needed for the distillative removal of the water.

(III) Methyl ethyl ketone is reacted with hydrogen peroxide, 70%, to produce a mixture of ketone hydroperoxides, using phosphoric acid catalyst. Here the ketone is the water entrainer and a sufficient excess is introduced into the reaction zone to remove not only the water of reaction but also the water brought in by the hydrogen peroxide.

The amount of azeotroping entrainer needed is determined by the reaction system. In general, with the lower boiling compounds previously described, an excess of about 100–500% is used, and more usually about 200–400%.

Many of these liquid azeotropes are heterogeneous, i.e., form layers and a water phase may be separated from an organic liquid phase; the organic phase may be returned to the reaction zone when one of the reactants is the entrainer.

EXAMPLE 1

*Preparation of butyl, 4,4-bis(t-butyl peroxy) valerate*

A. It was desired to prepare butyl 4,4-bis(t-butyl peroxy) valerate by the reaction of butyl levulinate and t-butyl hydroperoxide. When these were reacted using a small excess of hydroperoxide, in the presence of solid sulfonic acid ion exchange resin at about 25° C., in a batch operation; and the bis peroxy compound then recovered by distilling off water and unreacted hydroperoxide, low yields, 30–40%, of the bis peroxy compound were obtained.

B. The apparatus was modified to permit distillative removal of a vapor stream from the reaction flask. 43 grams (0.25 mole) of butyl levulinate, 148 g. (1.5 moles) of t-butylhydroperoxide—200% excess—and 5 g. of Amberlyst 15 sulfonic acid ion exchange resin catalyst were stirred at 20°–25° C. A vapor stream of water and t-butyl hydroperoxide azeotrope was taken overhead by slowly reducing the pressure on the reaction system. A trap permitted separating a water phase from a t-butyl hydroperoxide phase—each phase contained some dissolved hydroperoxide or water, respectively. When water had ceased to come overhead, the remaining unreacted t-butyl hydroperoxide was distilled away to leave behind "product" butyl 4-4-bis (t-butyl peroxy) valerate. This "product" assayed 89% of the desired compound, representing about the same yield of desired compound on butyl levulinate charged.

EXAMPLE 2

*Preparation of t-butyl hydroperoxide*

A. In the commercial preparation of t-butyl hydroperoxide, hydrogen peroxide, t-butyl alcohol and aqueous sulfuric acid catalyst are charged to the reaction vessel. Some of the product is lost to the spent acid phase at the end of the reaction. The product consists of a mixture of t-butylhydroperoxide and di-t-butylperoxide. By a very careful control of conditions, it is possible to obtain the hydroperoxide as the major product.

B. Using the apparatus described in Example 1B, 44.5 g. (0.60 mole) of t-butyl alcohol, 7.5 g. (0.20 mole) of 90% hydrogen peroxide and 1.0 g. of Amberlite 200 sulfonic acid ion exchange resin catalyst were reacted at about 40° C. Pressure on the reactor was slowly reduced to maintain distillation of an alcohol-water azeotrope. When water ceased to come overhead, the reaction was stopped. Analysis showed unreacted hydrogen peroxide was present in the reaction product mixture—an insufficient amount of alcohol had been charged. Analysis of the organic peroxy compound showed only a small amount of the undesired di-t-butylperoxide compound had been formed. Essentially all the product was t-butylhydroperoxide.

EXAMPLE 3

*Preparation of t-amyl hydroperoxide*

Here: 264 g. (3.0 moles) of t-amyl alcohol, 37.8 g. (1.0 mole) of 90% hydrogen peroxide and 10.0 g. of Amberlite 200 were maintained at about 35° C.; an azeotrope of alcohol and water was distilled overhead by slowly dropping the pressure on the reaction vessel. Assay of the reaction product mixture remaining in the vessel established that about 95% of the $H_2O_2$ has been reacted. Only a minimal amount of the undesired di-t-amyl peroxide had been formed.

EXAMPLE 4

*Preparation of 2,5-dimethyl-2,5-bis (t-butyl peroxy) hexyne-3*

A mixture of 14.2 g. (0.1 mole) of 2,5-dimethyl-2,5-dihydroxy hexyne-3, 98.5 g. (1.0 mole) of 91% t-butyl hydroperoxide and 10.0 g. of Amberlyst 15 strong acid ion exchange resin was heated at 35–40° C. while the pressure on the system was slowly reduced to maintain distillation of the t-butyl hydroperoxide-water azeotrope. The resin was removed by filtration and the stripped product submitted for assay. Gas-liquid chromatographic assay showed the product to contain approximately 30% of 2,5-dimethyl-2,5-bis(t-butylperoxy) hexyne-3.

EXAMPLE 5

*Preparation of t-butylperoxy caproate*

A mixture of 23.2 g. (0.2 mole) of caproic acid, 187 g. (2.0 moles) of 91% t-butyl hydroperoxide and 5.0 g. of dry Amberlyst 15 sulfonic acid ion exchange resin was stirred at 20–26° while the pressure on the system was gradually reduced to maintain the distillation of the azeotrope of t-butyl hydroperoxide and water. When the pressure had reached 1.5 Torr, the reaction was stopped, the resin separated and the product analyzed. The active oxygen determination indicated that a 16% yield of t-butyl-peroxy caproate had been obtained.

Continuous process

The figures show four embodiments of elongated reactors suitable for carrying out the process of the invention in a continuous manner. The reaction mixture is passed in contact with an acidic solid ion exchange resin catalyst; reaction product is withdrawn from the contacting zone and water product of the reactor is continuously removed in the form of an azeotrope wherein the entrainer is at least one of the organic compounds present.

In all the embodiments of the figures, contacting zone 8 is filled with an acidic solid ion exchange resin catalyst 10. The temperature of reaction is controlled by means of liquid circulated through jacket 12. A vapor space 14 is provided immediately adjacent the contacting zone 8. The vapor space 14 is separated from zone 8 by a gas permeable member 16 which may be a wire screen, perforated plate or porous ceramic. In FIGS. I and II, member 16 is shown as a cylindrical tube made of wire screen. FIGS. III and IV show a flat screen 18. The azeotrope vapor is withdrawn from a vapor space 14 by conduits (not shown) in a conventional manner.

FIG. I is adapted for a vertical reaction zone, whereas FIGS. II–IV are adapted for inclined and horizontal reaction zones.

The continuous process of the invention is illustrated by reaction zone constructed on the lines of FIGS. I and II. It is to be understood numerous other reaction zones suitable for continuous operation may be devised and the invention is not limited to those shown in the figures.

EXAMPLE 6

*Preparation of t-butylperoxy caproate*

A vertical column approximately 1 inch in diameter and 24 inches long equipped with a water jacket was used for this reaction. A ¼ inch diameter tube made of 100 mesh stainless steel screen was centered in the column and the remaining space filled with commercial Amberlyst 15 strong acid ion exchange resin. (See FIG. I.)

While maintaining the jacket temperature at about 40° C. and the pressure in the system at 29 Torr, a mixture of 23.2 g. (0.2 mole) of caproic acid and 187.0 g. (2.0 moles) of 91.5% t-butyl hydroperoxide was passed through the column and the water—t-butyl hydroperoxide azeotrope continuously removed. (One Torr equals one mm. of Hg pressure.)

After passing through the column, the resulting mixture was stripped in a rotating evaporator at 35° C. and 5 Torr. The product assayed 45% t-butylperoxy caproate for an actual yield of 38.5% of the desired compound.

EXAMPLE 7

*Preparation of 2-methyl-2-(t-butylperoxy)-4-pentanol*

A vertical jacketed column about 1 inch in diameter and 13 inches long having a central tube about ¼ inch in diameter made of 100 mesh stainless steel screen was filled with commercial Amberlyst 15 strong acid ion exchange resin. (See FIG. I.)

While maintaining the jacket temperature at about 40° C. and the pressure in the system at 27 Torr, a mixture of 11.8 g. (0.1 mole) of hexylene glycol and 98.5 g. (1.0 mole) of 91.5% t-butyl hydroperoxide was passed through the column and the water—t-butyl hydroperoxide azeotrope continuously removed. After the mixture had passed through the column, the pressure was reduced to 15 Torr and the mixture again passed through the column.

The product was stripped in a rotating evaporator at about 45° and 2 Torr and finally taken up in pentane and washed with water. After removal of the pentane under reduced pressure, the product was examined by gas-liquid chromatography. The assay for 2-methyl-2-(t-butyl-peroxy)-4-pentanol showed that the sample contained 34% of the desired product.

EXAMPLE 8

*Preparation of butyl 4,4-bis(t-butylperoxy valerate)*

A mixture of 95.7 g. (1.0 mole) of 94.3% t-butyl hydroperoxide and 43.0 g. (0.25 mole) of butyl levulinate was passed through a water jacketed reaction column about 60 cm. long filled with Amberlyst 15 strong acid ion-exchange resin, having an open vapor space maintained by a ¼" tube formed from 100 mesh stainless steel screen and having a take-off connection for the azeotroping vapor at about the midpoint of the column (see FIG. II). With the column inclined at about 15° from the horizontal to permit a flow of the liquid through the column, the pressure in the system was adjusted to 20–21 Torr with a manostat and the column temperature maintained at about 40° C. by circulating water through the jacket.

After the liquid mixture had passed through the column, the resin bed was washed with pentane and the combined solutions stripped at 35–40° C. in a rotating evaporator at 8 Torr. The product assayed 48.9% butyl 4,4-bis (t-butyl-peroxy) valerate for a 51.5% yield of the desired compound.

Sulfur containing peroxy compounds

A new class of peroxy compounds has been discovered. These compounds have at least 2 peroxy groups (—OOH or —OOR) joined to at least one carbon atom of an aliphatic group having at least two carbon atoms and including at least one group from the class consisting of substituted sulfonyl, substituted sulfoxide and substituted sulfide. Two peroxy groups may be joined to a common carbon atom. The sulfur containing group may be joined to a carbon atom which is free of substituent peroxy group(s). It is preferred that the substituent in the sulfur containing group be aromatic. Illustrative compounds are: 2,2-bis(t-butylperoxy)-1-phenylsulfonyl propane; 1-phenylsulfonyl-2,2-bis(t-butylperoxy) propane; 1-phenylsulfonyl-3,3-bis(t-butylperoxy)butane; 1-phenylsulfonyl-3,3-bis(t-butylperoxy)pentane; 2-methyl-2-phenylsulfonyl-4,4-bis(t-butyl peroxy)pentane.

EXAMPLE 9

*Preparation of 2,2-bis (t-butylperoxy)-1-phenylsulfonyl propane*

A solution of 11.88 g. (0.06 mole) of 1-phenylsulfonylacetone dissolved in 59.1 g. (0.6 mole) of 91% t-butyl hydroperoxide was heated in the presence of 5.0 g. of Amberlyst 15 strong acid ion exchange resin while the pressure on the system was slowly reduced to maintain distillation of the t-butyl hydroperoxide-water azeotrope. After 3 hours another charge of 35 g. of 91% t-butyl hydroperoxide was added and the reaction continued. The residue was dissolved in benzene, the solution washed with dilute sodium hydroxide solution and water, and the benzene evaporated under reduced pressure. The 1-phenylsulfonyl-2,2-bis(t-butylperoxy) propane product melted at 89–91° C. and was obtained in a yield of 64.5% of theory.

Preparation of peroxy compounds from olefins

It is possible to prepare peroxides and hydroperoxides from olefins by first dissolving the olefins in moderate concentrations of sulfuric acid and then adding the mixture to hydrogen peroxide. The tendency of olefins such as isobutylene to polymerize to diisobutylene and higher molecular weight materials in the presence of strong sulfuric acid has limited the utility of this method of preparing compounds such as di-t-butyl peroxide and t-butyl hydroperoxide. The use of the more moderate concentrations of sulfuric acid results in slower reaction and loss of the products by solubility in the large volumes of sulfuric acid employed.

It has been discovered that olefins such as isobutylene and 2-methyl-butene-2 can be treated with hydrogen peroxide in the presence of ion exchange resins to give the desired peroxides and hydroperoxides in high yield.

Any olefin may be the feed to the process which has at least three carbon atoms; more usually the olefin has 4 or more carbon atoms. The secondary olefins, such as isobutylene, are a preferred feed and preferably those having 4–12 carbon atoms.

The hydrogen peroxide may be of the concentration needed for the particular reaction system. Usually the hydrogen peroxide has a concentration of at least about 30%.

An acidic solid ion exchange resin is used as the catalyst in this process. These may be any of those hereinbefore set forth.

EXAMPLE 10

A mixture of 5.6 g. (0.10 mole) of isobutylene, 1.9 g. (0.05 mole) of 90% hydrogen peroxide, 1.0 g. of dry Dowex 50 × 8 ion exchange resin and 6.0 g. of pentane was stirred at −30° to −20° C. for two hours and then allowed to warm slowly to room temperature. Analysis of the product for active oxygen gave: "Method 10", 3.27%; "Method 7," 3.20%; (O) $H_2O_2$, 0.2%. Most of the active oxygen used was converted to t-butyl hydroperoxide.

EXAMPLE 11

A similar reaction in which 7.0 g. (0.1 mole) of 2-methyl-butene-2, 1.9 g. (0.1 mole) of 90% hydrogen peroxide and 1.0 g. of dry Amberlyst 15 was mixed at 0°, allowed to warm to room temperature and the product separated and submitted for assay for active oxygen, gave: "Method 10," 6.34%; (O) $H_2O_2$, O; "Method 7," 3.67%.

In another method for preparing t-butyl hydroperoxide, a mixture of previously prepared t-butyl hydroperoxide, concentrated hydrogen peroxide and ion exchange resin is treated at low temperature (about 0° to 10° C.) with isobutylene until the hydrogen peroxide had been used up. Filtration of the ion exchange resin allows the reaction product mixture to be processed further as by distillation; the resin can be reused.

Thus having described the invention, what is claimed is:

1. A process for the preparation of peroxy compounds which process comprises:
   reacting an olefin having at least 3 carbon atoms directly with hydrogen peroxide in the presence of an acidic solid ion exchange resin catalyst.
2. The process of claim 1 wherein said olefin is a secondary olefin.
3. The process of claim 2 wherein said secondary olefin has 4–12 carbon atoms.
4. The process of claim 2 wherein said secondary olefin is isobutylene.
5. The process of claim 2 wherein said secondary olefin is 2-methyl-butene-2.
6. The process of claim 1 wherein said resin is a sulfonic acid exchange resin.
7. A process for preparing t-butyl hydroperoxide which process comprises:
   reacting isobutylene directly with 90% hydrogen peroxide at a temperature of about −30° to −20° C., in the presence of a solid sulfonic acid ion exchange resin, catalyst, and
   separating solid catalyst to recover a reaction product mixture including t-butyl hydroperoxide.

References Cited by the Examiner

UNITED STATES PATENTS

| | | | |
|---|---|---|---|
| 2,176,407 | 10/1939 | Milas | 260—610 |
| 2,223,807 | 12/1940 | Milas | 260—610 |
| 2,619,507 | 12/1952 | Jones | 260—607 |

OTHER REFERENCES

Amberlite Ion Exchange, page 10, Catalyst by Acids and Bases (1953), Rohm & Haas. Pub., Base Exchange Digest.

Chem. & Eng. News, page 557 (1949).

Ion Exchange Resin, page 139, Kunin et al. (1952 ed.), Wiley & Sons Pub.

Ion Exchangers in Organic and Biochem., page 659, Astle (1957), Interscience Pub.

Dowex: Ion Exchange, pages 6, 7 and 71 (1958–64), Dow Chem. Co. Pub.

LEON ZITVER, *Primary Examiner.*

DANIEL D. HORWITZ, *Examiner.*

W. B. LONE, *Assistant Examiner.*